US006594409B2

(12) United States Patent
Dutt et al.

(10) Patent No.: US 6,594,409 B2
(45) Date of Patent: Jul. 15, 2003

(54) WDM TRANSMITTER OR RECEIVER INCLUDING AN ARRAY WAVEGUIDE GRATING AND ACTIVE OPTICAL ELEMENTS

(75) Inventors: Birendra Dutt, Westchester, CA (US); James Chan, Rancho Palos Verdes, CA (US)

(73) Assignee: APIC Corporation, Culver City, CA (US)

( * ) Notice: Subject to any disclaimer, the term of this patent is extended or adjusted under 35 U.S.C. 154(b) by 0 days.

(21) Appl. No.: 09/838,709

(22) Filed: Apr. 18, 2001

(65) Prior Publication Data

US 2002/0154847 A1 Oct. 24, 2002

(51) Int. Cl.$^7$ ................................................. G02B 6/12
(52) U.S. Cl. .............................. 385/14; 385/15; 385/49; 385/88
(58) Field of Search ............................. 385/14, 15, 49, 385/88

(56) References Cited

U.S. PATENT DOCUMENTS

| 4,514,748 | A |   | 4/1985  | Bean et al.       |         |
|-----------|---|---|---------|-------------------|---------|
| 4,946,553 | A | * | 8/1990  | Courtney et al.   | 156/304.1 |
| 5,206,920 | A | * | 4/1993  | Cremer et al.     | 359/115 |
| 5,472,505 | A | * | 12/1995 | Lee et al.        | 117/200 |
| 5,617,234 | A |   | 4/1997  | Koga et al.       |         |
| 5,692,076 | A | * | 11/1997 | Delisle et al.    | 385/15  |
| 5,784,187 | A | * | 7/1998  | Cunningham et al. | 359/248 |
| 5,799,117 | A | * | 8/1998  | Kragl et al.      | 264/1.24 |
| 5,930,448 | A |   | 7/1999  | Lee et al.        |         |
| 5,937,117 | A |   | 8/1999  | Ishida et al.     |         |
| 5,943,452 | A |   | 8/1999  | Himeno et al.     |         |
| 5,953,139 | A |   | 9/1999  | Nemecek et al.    |         |
| 6,060,704 | A |   | 5/2000  | Hyun et al.       |         |
| 6,061,487 | A |   | 5/2000  | Toyama et al.     |         |
| 6,278,813 | B1 | * | 8/2001  | Takada et al.    | 385/14  |
| 6,316,281 | B1 | * | 11/2001 | Lee et al.       | 118/724 |
| 6,330,378 | B1 | * | 12/2001 | Forrest et al.   | 372/50  |
| 6,356,572 | B1 | * | 3/2002  | Tanaka et al.    | 257/15  |
| 6,392,257 | B1 | * | 5/2002  | Ramdani et al.   | 257/190 |
| 6,433,399 | B1 | * | 8/2002  | Polman et al.    | 257/431 |

FOREIGN PATENT DOCUMENTS

EP   1 085 354 A2    3/2001
WO   PCT/US02/12216  8/2002

OTHER PUBLICATIONS

Bernd Schüppert, et al., "Integrated Optics in Silicon and SiGe–Heterostructures," Journal of Lightwave Technology, vol. 14, No. 10, pp. 2311–2322, Oct. 1996.
Donald R. Larson, et al., "Hydrogenated Amorphous Germanium Detectors Deposited onto Channel Waveguides," Optics Letters, vol. 15, No. 10, pp. 544–546, May 15, 1990.

* cited by examiner

Primary Examiner—Robert H. Kim
Assistant Examiner—Richard Kim
(74) Attorney, Agent, or Firm—Hogan & Hartson, LLP (57) ABSTRACT

An optical component is formed on a silicon on insulator (SOI) substrate and has an array waveguide that demultiplexes an input light signal into N channels and provides that light signal to a corresponding set of N waveguide structures formed on a surface of the SOI substrate. The N waveguide structures provide the N channels of light to N optical detectors. Each optical detector is bonded to a surface of a corresponding one of the waveguide structures. The N channels of light pass through the N waveguide structures and are coupled into the N optical detectors so that light from a corresponding channel of the array waveguide is coupled into a corresponding optical detector and converted into an electrical signal.

4 Claims, 10 Drawing Sheets

WDM TRANSMITTER OR RECEIVER INCLUDING AN ARRAY WAVEGUIDE GRATING AND ACTIVE OPTICAL ELEMENTS

BACKGROUND OF THE INVENTION

1. Field of the Invention

The present invention relates to optical communications of the type used in communication over optical networks and particularly relates to optical communications through fiber optic links using multiple wavelength or broad spectrum light for communication.

2. Discussion of the Related Art

Optical communications networks have become prevalent in long distance communication networks, including for the backbone of the Internet. Demand for additional bandwidth in all manner of optical networks continues to grow and a variety of different strategies have been adopted to improve the utilization of the bandwidth within existing optical fiber networks. There is, for example, increasing utilization of multiple wavelength or broad-spectrum light communication over optical fiber links, generally using the technology known as wavelength division multiplexing ("WDM"). Presently the most common implementation of WDM communication uses a plurality of different lasers as light sources, with each laser emitting light at a wavelength different from the wavelengths emitted by the other lasers in the system. Each of the different wavelengths of light represents a different, substantially independent communication channel and symbols can be transmitted on each of these different communication channels using a modulation and encoding stream appropriate to the channel. For example, each of the channels might be modulated and encoded using time domain techniques.

As an alternate to using lasers to define a plurality of distinct communication channels, a broader spectrum light source might be used and distinct optical channels defined within the broader spectrum light source. Different channels are defined to include a range of wavelengths about a central wavelength, with each channel extending across a range of wavelengths sufficient for reliable detection and separated from the one or more other channels by sufficient wavelength separation to allow for discrimination of adjacent channels. Examples of a broad-spectrum source might include, for example, a super luminescent diode (SLD). The definition of different channels from this broadband light source might be accomplished using a wavelength dispersive grating and a filter or by using one or more Bragg grating filters cascaded within an optical fiber.

Multiple wavelength systems such as WDM systems require that the various communication channels associated with the different wavelengths of light be separated out at different points along a transmission path. For example, an optical fiber having two channels defined as distinct wavelengths or as distinct wavelength ranges might, at different points in time, have signals bound for distant nodes on the network. At some switching node along the communication path, it is necessary for the network to separate these channels so that the signals on these channels can be routed appropriately. This is accomplished, for example, by separating out the wavelengths or wavelength ranges associated with the desired channels using an add/drop filter connected to the fiber. Successive add/drop filters are used to successively select desired channels from the fiber, for example to route the signal on that channel to a different node of the network.

An alternate strategy to the use of add/drop filters includes the use of an array waveguide grating to disperse and separate the broad spectrum light. The separated light is then passed through a set of optical switches such as an array of Mach-Zehnder switching elements. One or more of the outputs from the array of switching elements is then combined into an optical fiber for further transmission. In this way, an array waveguide in combination with other optical elements can provide switching within a multi-wavelength, multi-channel optical communication system. Such a system is described for example in U.S. Pat. No. 5,937,117 to Ishida, et al., entitled "Optical Cross-Connect Device." The Ishida patent shows a number of different configurations for switches based on array waveguide gratings.

A difficulty with the various devices shown in the Ishida patent is that the array waveguide grating receives inputs and couples its outputs to other devices through optical fibers. Coupling optical fibers to devices such as array waveguide gratings presently involves a largely manual process called "pigtailing" in which each fiber is separately connected to the array waveguide grating. An optical element processing N channels of light typically requires 2N manual pigtail connections to couple light into and out of the element. This assembly work is particularly time consuming and difficult because the pigtailed fibers must be aligned carefully with the input optics of the array waveguide grating. Assembling the devices shown in the Ishida patent is time consuming and undesirably increases the cost of the illustrated switches. The expense of such switches presently limits the possibility of using such switches in many applications.

A similar problem arises when array waveguide gratings are used in combination with detectors to form an analyzer or a channel receiver. Receiving the signals from a channel is accomplished by separating the different channels of light in the optical fiber through a wavelength dispersion and separation element. The separated channel is then provided to a detector that converts the encoded light within the channel into an electrical signal. Such a device is illustrated in U.S. Pat. No. 5,617,234 to Koga, et al., entitled "Multi-wavelength Simultaneous Monitoring Circuit Employing Arrayed-Waveguide Grating." As can be seen in the Koga patent, input and output connections are also made through pigtailed fiber connections to and from the array waveguide grating. Assembly of the illustrated devices requires considerable precise manual labor, undesirably increasing the cost of the components.

It is consequently an object of the present invention to provide optical networking elements having a higher degree of integration that might facilitate less expensive networks and wider application of optical switches.

SUMMARY OF THE PREFERRED EMBODIMENTS

An aspect of the present invention provides an optical component with a substrate having one or more waveguide structures formed on a surface. The substrate comprises a first semiconductor material. An optical detector is bonded to a surface of a first of the waveguide structures and comprises a second semiconductor material different from the first semiconductor material and adapted so that light from the first waveguide structure is coupled into the optical detector and converted into an electrical signal.

Another aspect of the invention provides an optical component with a substrate having an plurality of waveguide structures formed on a surface, at least a portion of the array comprising substantially parallel waveguide structures. The substrate comprises a first semiconductor material. The component includes an array of optical detectors, each optical detector bonded to a surface of a corresponding one of the waveguide structures. The optical detectors comprise a second semiconductor material different from the first semiconductor material and are adapted so that light from a corresponding waveguide structure is coupled into a corresponding optical detector and converted into an electrical signal.

Still another aspect provides an optical component with a silicon on insulator substrate having an plurality of waveguide structures formed on a surface, at least a portion of the array comprising substantially parallel waveguide structures, the substrate further comprising an array waveguide coupled to the plurality of waveguide structures. The optical component includes N optical detectors. Each optical detector is bonded to a surface of a corresponding one of the waveguide structures. The N optical detectors comprise a second semiconductor material different from a surface of the silicon on insulator substrate. The array waveguide separates an input light beam into N channels and provides the N channels through the plurality of waveguides to corresponding ones of the N optical detectors. Light from a corresponding channel of the array waveguide is coupled into a corresponding optical detector and converted into an electrical signal.

BRIEF DESCRIPTION OF THE DRAWINGS

FIG. 6 includes FIGS. 6a–6d, each showing different views and aspects of the FIG. 6 device.

DETAILED DESCRIPTION OF THE PREFERRED EMBODIMENTS

Figure 1:
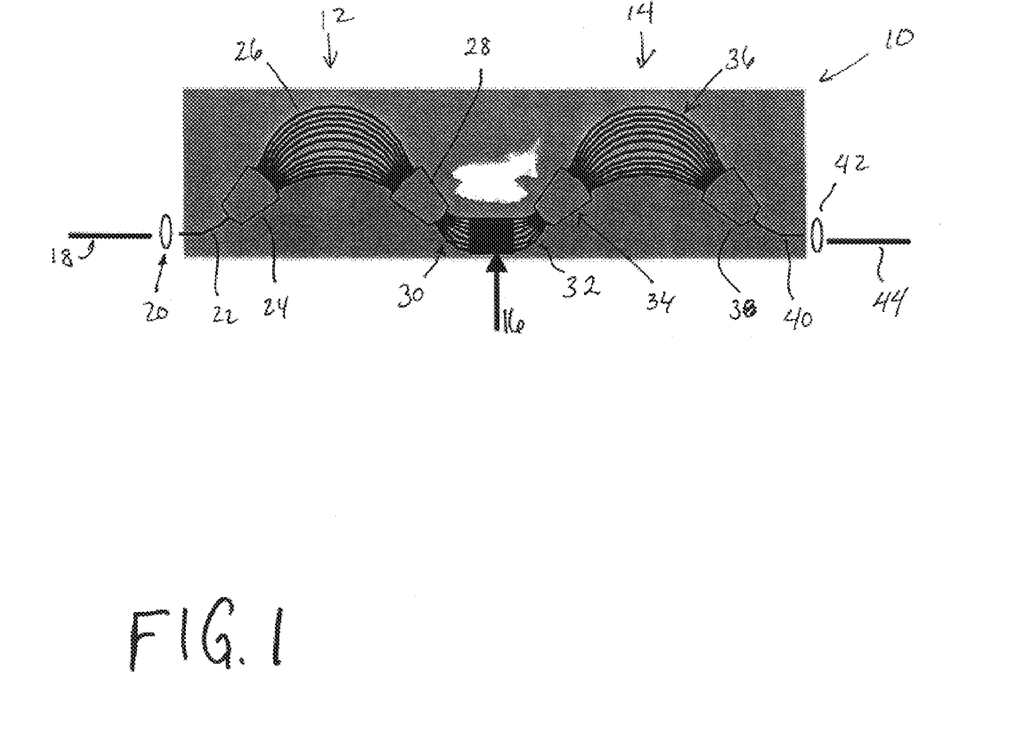
FIG. 1 schematically illustrates a basic implementation of aspects of the present invention, providing along either direction of travel an optical path through a dispersion element, an array of optical elements and a recombining element.

FIG. 1 illustrates a basic implementation of certain aspects of the present invention. Referring to FIG. 1, an integrated photonic device 10 includes a first array waveguide grating 12, a second array waveguide grating 14 and an array of optical elements 16, preferably formed on a common substrate. The illustrated device 10 is preferably symmetric about the centerline through the array of optical elements. The optical elements are preferably chosen so that they modulate or operate on the light within a given channel in a substantially similar matter regardless of the direction that light passes through the optical element. Overall, it is preferred that the integrated photonic device 10 operate on light in a substantially similar manner regardless of the direction that light passes through the entire chip. Thus, in the following description of the FIG. 1 device, the designation of input and output is arbitrary and this designation is preferably interchangeable.

Light is input to the device 10 from an optical fiber 18 and the light from the optical fiber 18 is coupled into the device 10 through a lens 20. This illustration of the input stage is exemplary but is presently expected to be a common implementation. The light output from the lens 20 is coupled through a waveguide 22 into a dispersion/combining area 24 in which the light preferably is guided in the vertical direction but has free space propagation characteristics in the horizontal direction. Preferably, the dispersion characteristics of the element 24 causes the light input to the waveguide 22 to be distributed substantially uniformly over the inputs of the arrayed waveguides 26 when light passes through the element in the described manner. When light passes through the dispersion/combining area 24 in the opposite direction, the light is preferably combined. The arrayed waveguides include a number of distinct waveguides, with each adjacent waveguide having a length incrementally longer than the adjacent waveguide. Length differences between adjacent waveguides are selected to achieve a desired level of wavelength separation between adjacent channels in the active region 16.

Light passes through the individual waveguides and exits the waveguides 26 into another dispersion/combining area 28, with light exiting the waveguides being combined on the opposite side of the element 28 into channels within a set of waveguides 30. The light within the channels 30 is separated into distinct wavelengths or ranges of wavelengths, most preferably corresponding to the different channels of the optical communications network. Each separate channel passes through a corresponding one of the array of active optical elements, for example modulators or switches, and is coupled into a receiving set of waveguides 32 that couples the channels into a dispersion/combining element 34 of the second array waveguide grating 14. The distinct channels of light are dispersed and preferably are spread substantially uniformly over the exit portion of the element 34, where the light is coupled into a set of arrayed waveguides 36, with each of the waveguides having an incrementally greater length corresponding to the length differences in the first set of arrayed waveguides 26 so that the second set of arrayed waveguides recombines the previously dispersed light. Light exits the arrayed waveguides 36 and is coupled into a dispersion/combining area 38 that finishes recombining the light and couples that light into an output waveguide 40. Output from the waveguide 40 preferably is focused by a lens 42 to couple the light into optical fiber 44.

In this way, integrated optical elements are provided that separate an input optical signal into constituent channels so that each channel is modulated separately and then recombines the signals into a broad spectrum optical signal so that the recombined optical signal can be provided to a conventional single mode optical fiber link. The integrated device 10 is most preferably formed on a single substrate that is most preferably a silicon on insulator (SOI) substrate. The silicon on insulator substrate is particularly preferred in accordance with the present invention, as the silicon surface layer is suitable for forming device electronics and also for forming waveguide elements. In such a preferred implementation of the present invention, the insulating layer, preferably a silicon oxide such as $SiO_2$ is provided at a depth that provides appropriate termination to the surface layer so that waveguide structure is of sufficient height to provide a guiding function.

Figure 2:
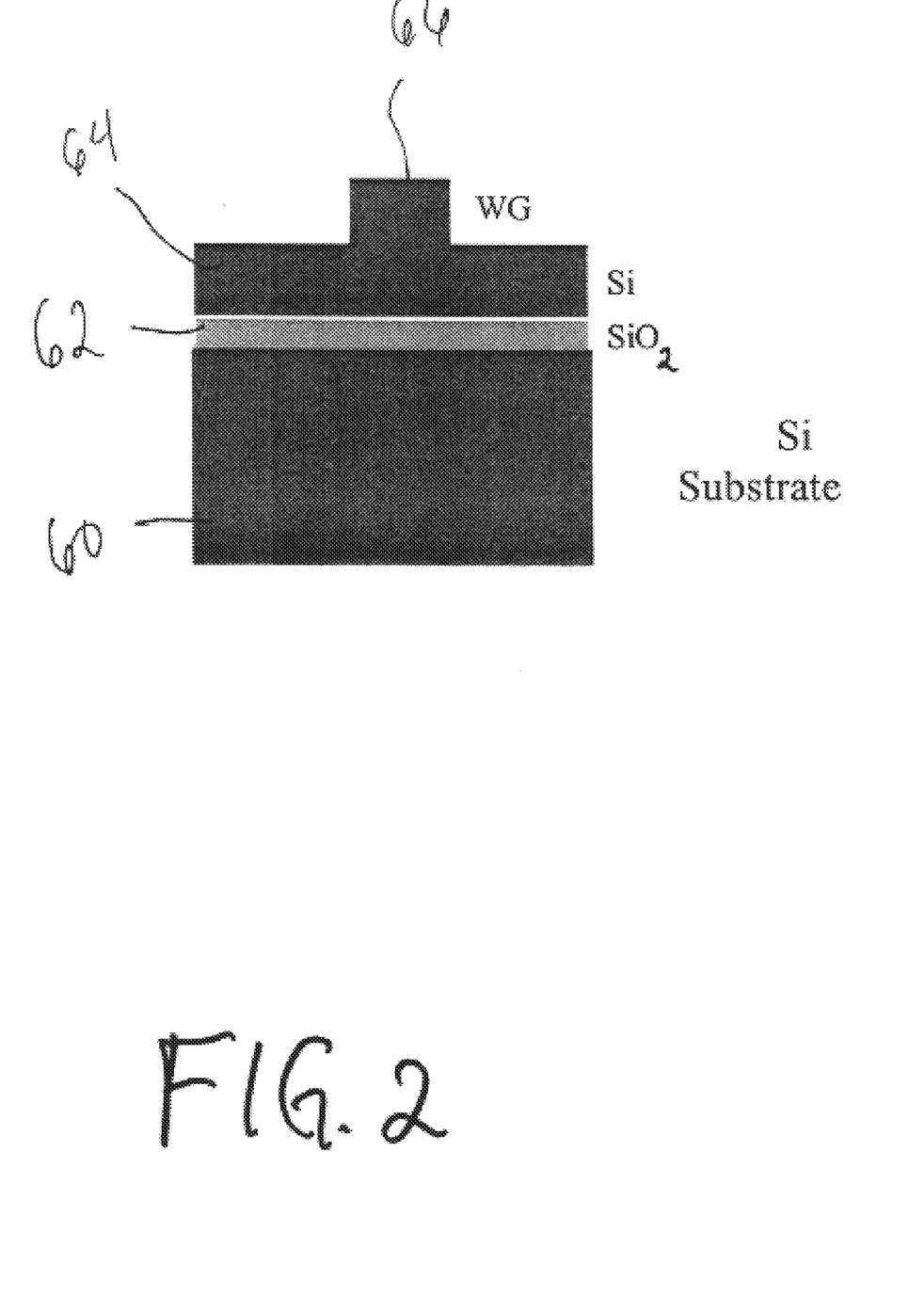
FIG. 2 illustrates in cross-section a portion of a waveguide structure in accordance with the present invention.

FIG. 2 illustrates in cross-section an exemplary embodiment of the SOI structure used in preferred embodiments of the present invention. The illustrated cross-section is preferably characteristic of the individual waveguides within the array waveguide structures 26, 30, 32 and 36 in the FIG. 1 illustrated embodiment. As shown in FIG. 2, the SOI structure includes a bulk silicon substrate 60 of sufficient thickness to provide a desired level of rigidity to the device 10 illustrated in FIG. 1. A silicon oxide layer 62, preferably comprising $SiO_2$, is approximately one micron thick and separates the bulk silicon substrate 60 from the silicon surface layer 64. Silicon wafers having such a buried insulating layer are presently commercially available and techniques for creating such a buried oxide layer, for example by oxygen ion implantation and annealing, are well known in the semiconductor processing arts at this time. The silicon surface layer is preferably sufficiently thick so that waveguide structures 66 such as that illustrated in FIG. 2 can be formed in the surface layer. In most instances, acceptable waveguide structures can be formed from a variety of different quality silicon layers, as the electrical properties of the surface silicon layer have comparatively little impact on the light propagation qualities of the silicon. Certain preferred embodiments of the present invention, on the other hand, use device quality silicon for the surface layer 64 so that modulation electronics can be formed in the surface layer.

The surface layer may, for example, be approximately three to five microns in thickness and the height of the waveguide 66 is approximately one and one half to two and one half microns. The waveguide is preferably approximately three microns in width. A waveguide 66 as illustrated will define a mode volume partially within the waveguide 66. Optical modes will be guided by the waveguide 66 due to the relative dimensions of the thickness of the surface layer, the thickness of the waveguide and the width of the waveguide structure.

It should be noted that, in accordance with this particularly preferred embodiment of the present invention, the dispersion/combining areas are preferably formed from the surface layer of the SOI substrate, to reduce insertion losses associated with coupling light through an interface such as an air-silicon interface. It is possible to provide the dispersion/combining elements as air structures bounded by silicon and other materials on its boundaries. Such a structure is expected to be more expensive and more lossy than the illustrated integrated structure and for those reasons is presently less preferred.

Figure 3:
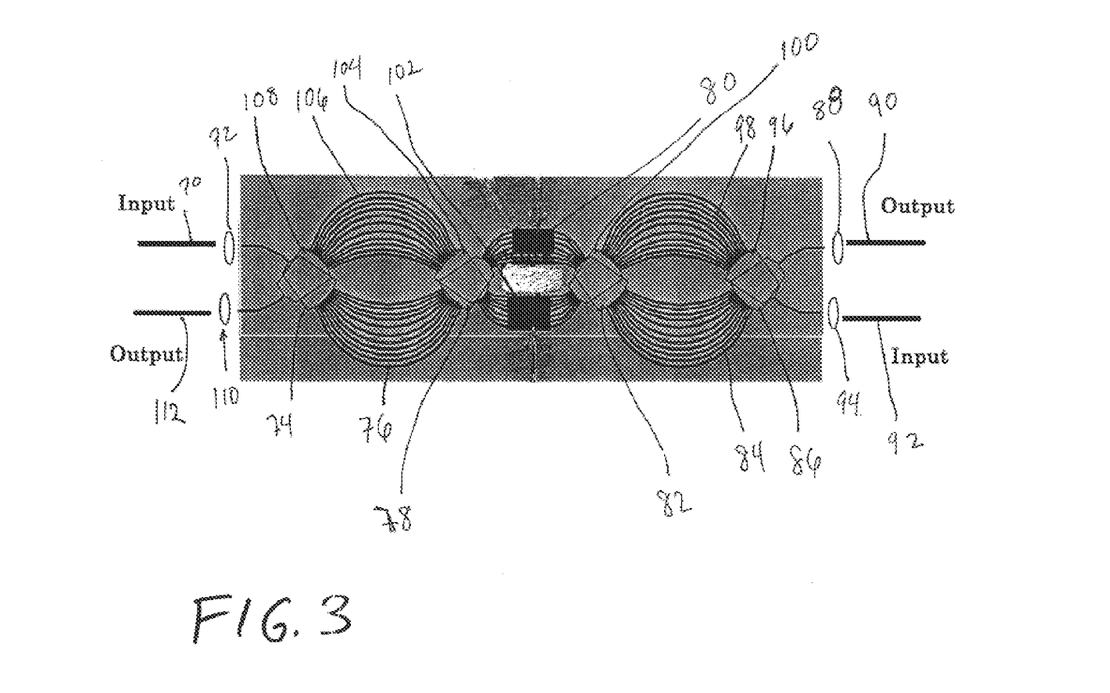
FIG. 3 schematically illustrates an implementation of aspects of the present invention, providing input and output paths through dispersion elements, arrays of optical elements and recombining elements.

As discussed above, the device 10 illustrated in FIG. 1 can operate on light propagating in either direction through the device. While this provides considerable flexibility to optical networks using devices like that illustrated in FIG. 1, the device 10 can operate on light propagating in only one direction at a time. Since it is contemplated that many devices like that illustrated in FIG. 1 might be present in a given switch, transceiver or other node on an optical network, it is desirable to provide even greater capacity to the device 10 illustrated in FIG. 1. A particularly preferred implementation of such additional capacity is illustrated in FIG. 3, which shows a device that includes two complete devices like the individual device 10 shown in FIG. 1. The illustrated integrated component consists of two of the FIG. 1 devices, with one of the devices flipped about a horizontal centerline so that the two devices are mirror images of each other. In this state, the two devices can be laid one on top of the other to provide the illustrated four port device. Each of the two FIG. 3 devices has the full capability of the individual devices of FIG. 1. In this way, each side of the FIG. 3 component can have an input and an output port, as illustrated. For simplicity, it is assumed that each of the constituent elements within the FIG. 3 component can be implemented using the same constituent elements having the same alternates and design considerations as were discussed above with respect to FIGS. 1 and 2.

A broad spectrum light signal provided to input port 70 is coupled into the component and through focusing lens 72 to the dispersion element 74. The light is dispersed and passed through the array waveguide 76 to separate the light into a number of component wavelength ranges. The light separated into different wavelength ranges is provided to the optical element 80, which may perform a number of different functions on the light incident on it. The light passed from the optical element 80 is provided into dispersing element 82 and into array waveguide 84, which recombines the wavelength ranges into a broad-spectrum optical signal. Combining element 86 recombines the broad-spectrum optical signal and provides that combined signal along a waveguide through the collecting optics 88 and into the output port 90 of this element of the FIG. 3 device.

The other element of the FIG. 3 device functions similarly, so that a broad spectrum light signal provided to input port 92 is coupled into the FIG. 3 component and through focusing lens 94 to the dispersion element 96. Dispersion element 96 disperses the light uniformly across the entrance to the array waveguide 98, which separates the light into distinguishable channels based on different wavelength ranges of light. The light is dispersed and passed through the array waveguide 76 to separate the light and then recombined in the combining element 100. The recombined light is provided to the optical element 102, which may perform a number of different functions on the light incident on it. The light passed from the optical element 102 is provided into dispersing element 104 and into array waveguide 106, which recombines the wavelength ranges into a broad-spectrum optical signal. Combining element 108 recombines the distinct wavelength ranges into a broad-spectrum optical signal and provides that combined signal along a waveguide through the collecting optics 110 and out through the output port 112 of this element of the FIG. 3 device.

The illustrate device is, like that illustrated in FIG. 1 and discussed above, optically symmetric in its most generic configuration, so that the input and output ports can be interchanged in at least some embodiments. Optical symmetry is not always achieved and not always desired for the FIG. 3 device. Variations from optical symmetry can be implemented by selecting the functions of the optical elements 80 and 102. In many preferred embodiments, the optical elements are active devices.

The active devices 80, 102 shown in FIG. 3 are, in different preferred embodiments, either switches or modulators. Switches may be provided using, for example, Mach-Zehnder elements such as those illustrated in U.S. Pat. No. 6,061,487 to Toyama, et al., entitled "Optical Waveguide Circuit, Optical Branched Waveguide Circuit, and Optical Modulator," which patent is hereby incorporated in its entirety. The Toyama patent is particularly incorporated for its teachings regarding Mach-Zehnder elements and the implementation of such elements on silicon substrates. One switching element is preferably provided for each channel of distinct wavelength ranges. When using the Mach-Zender element or similar elements, each of the switches for each of the channels is individually controllable.

Figure 4:
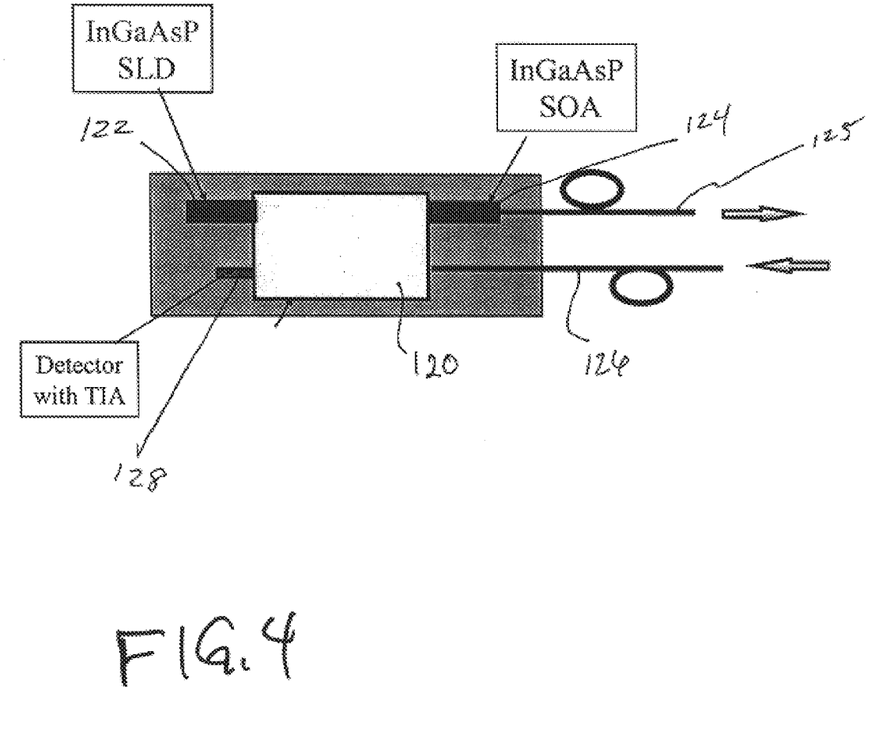
FIG. 4 illustrates a programmable, integrated transceiver based on the architecture illustrated in FIG. 3.

FIG. 4 shows a transceiver based on the two broad-spectrum channel component of FIG. 3 and using Mach-Zender elements as individual switching elements for each of the active devices 80, 102. Such a structure can be used in a number of different configurations.

In the FIG. 4 system, the component 120 is preferably an integrated implementation of the FIG. 3 architecture on a silicon on insulator substrate and four ports: two input and two output. For convenience, the integrated, SOI implementation of the FIG. 3 component is referenced here as a photonic integrated circuit (PIC). In one configuration, the FIG. 4 device can be a programmable transmitter. For this configuration, the active devices 80, 102 are controllable switches such as Mach-Zender switches. Such an implementation includes a broadband source such as a superluminescent diode (SLD) 112, which might be an indium gallium arsenic phosphide (InGaAsP) element, is connected to the input of the two broad-spectrum channel PIC 120. The SLD light source 122 is coupled to the input port of the PIC 120 either by butt-joint or by fiber pigtailing. Note that, while this coupling might still entail handwork, it requires less handwork than the conventional less integrated component. This is because the input signal is broad-spectrum and the signal is separated into N component wavelength ranges within the PIC. Thus, only a single butt-joint or pigtail is needed to provide the connection, while the conventional configuration uses at least N connections if there are N channels provided to the switching elements.

Internal to the PIC, the broad-spectrum signal of the superluminescent diode can be divided into N component wavelengths corresponding to N largely independent optical communication channels. The photonic integrated circuit (PIC) 120 selects any one of the N channels by the array of switches, for example, by the array of Mach-Zehnder switches that make up the illustrated implementation of the PIC's internal active device. In this way the PIC 120 can select any one or any combination of the N wavelength ranges to output as wavelength selected or wavelength modulated light. Because each channel is controllable, a single channel can be output or two or more WDM channels can be provided. In this way, the FIG. 4 device can be a programmable light source for outputting a desired spectrum selected or modulated light source out of the output port 124. The multiple channels of different wavelength range light might be selected and modulated for a conventional WDM application or it might be used for a modulation scheme in which a particular spectrum of channels is used to define a channel.

As a complement to the use of the FIG. 4 component as a programmable light source, the component preferably provides an integrated solid state optical amplifier (SOA) at the output port 124. The SOA is particularly useful here to amplify a selected few or one channel of output light out of the total of N channels into which the light was separated within the PIC component 120. Preferably the SOA is an InGaAsP broad-spectrum amplifier that amplifies a range of signals largely independent of the input signal. The output of the preferred InGaAsP SOA is provided to an output fiber 125. As discussed above, because the signals output from the PIC component 120, which might include up to N channels, are multiplexed within the PIC component 120, only a single connection need be made.

Another element of this FIG. 4 component functions as a programmable detector capable of selecting and detecting a single channel or set of channels of light. Input signals are provided through a receiving fiber 126 from an external source such as a communication network. When the structure is used as a programmable receiver, the input from fiber 126 is demultiplexed by the first array waveguide within the PIC component 120 into different wavelength channels. An array of switches similar to that discussed above selects a desired channel for detection. Each of the switches is individually controllable to select a single channel of light. The second internal array waveguide multiplexes the light channels together again internal to the PIC component 120 and provides the selected and recombined detected light signal to a detector at the other output port 128 of the FIG. 4 component. In the FIG. 4 illustration the detector is butt-coupled to the component and includes an integrated transimpedance amplifier to condition the signal for output form the detector to other detection and processing circuitry. As an alternate to the butt coupled detector, the component might detect the selected light channel with a germanium detector grown on the output port 128 of the PIC component 120.

Figure 5:
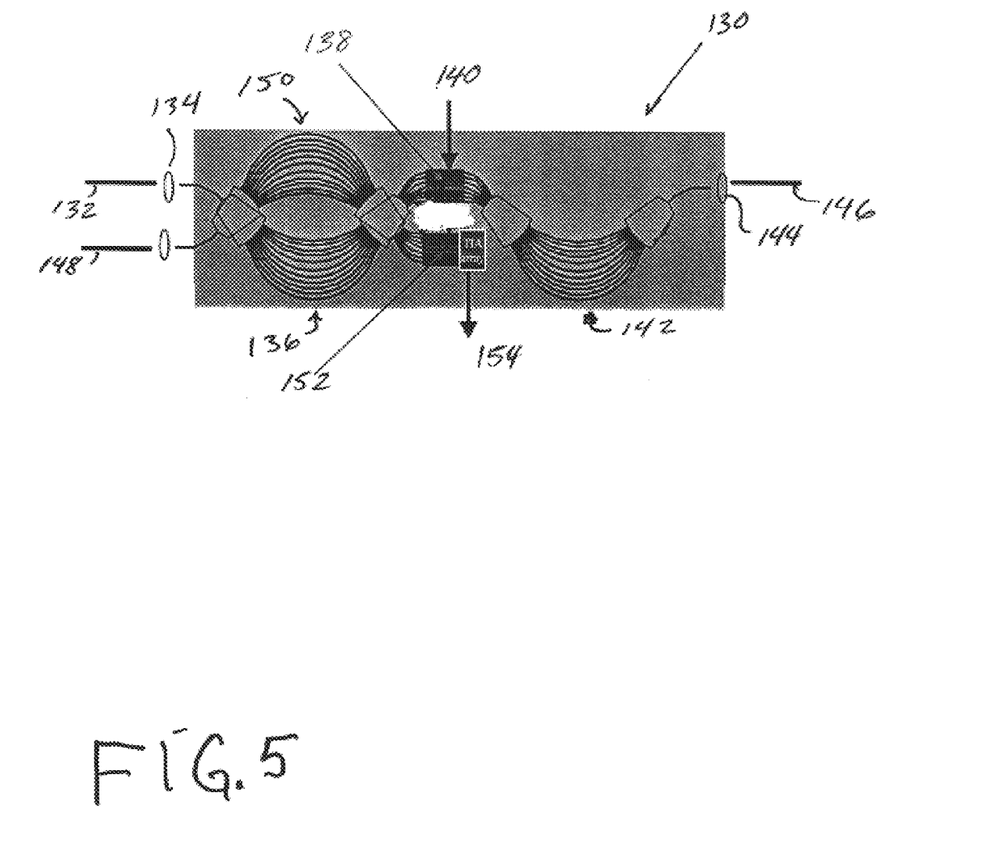
FIG. 5 illustrates a programmable, integrated transceiver based on a modification of the architecture illustrated in FIG. 3.

FIG. 5 shows a different type of transceiver, based on a modification of the FIG. 3 architecture. The illustrated components are generally similar to those illustrated in FIG. 4 and so are not discussed in additional detail here. The FIG. 5 component 130 most preferably is provided on a single SOI substrate and preferably functions as a programmable light source capable of independently modulating each of its N channels of light. A superluminescent diode 132 is coupled through focusing optics 134 into the component 130 and into a first array waveguide 136 that separates the broad-spectrum light signal into N channels defined within different wavelength ranges of the light. The separated N channels are provided to an array 138 of high speed, current-injection switches. The current-injection switches are formed in the silicon surface layer of the SOI substrate and connections to the switches are made using conventional interconnect and bump bonding technology. A set of driving signals 140 is provided to the switch array to provide the desired individual channel modulation. The current-injection switches are sufficiently high speed, in the gigabit per second (Gbps) range, as to directly modulate the channels of light. After modulation, the separated signals are multiplexed by the second array waveguide 142 and provided to the output optics 144 and output through fiber 146. Although coupling optics are illustrated here, in most cases the output coupling can also be achieved through butt coupling the fiber 146 to the component 130.

Another modified aspect of the FIG. 5 structure is that the N channels of received light are detected and processed in parallel. Broad-spectrum light is received over fiber 148 and is demultiplexed within array waveguide 150. The demultiplexed light is provided to an array of N detectors 152 corresponding to the N distinct channels of light that are defined in the different wavelength ranges. The detected light signals are converted into electrical signals and provided to a corresponding array of transimpedance amplifiers that condition and, as desired, amplify the signals for output as detected electrical signals 154. Most preferably the array of detectors is an array of independent germanium PIN diodes formed on the silicon surface of the preferred SOI substrate. Formation of such an array of germanium circuits is discussed below.

As illustrated, the FIG. 5 component is a highly integrated programmable and modulating light source for N channels of optical communication. Similarly, the FIG. 5 component is a highly integrated N channel optical detector. Both sets of functionality are provided on a single substrate with a common set of manufacturing processes.

Figures 6, 6A, 6B, 6C:
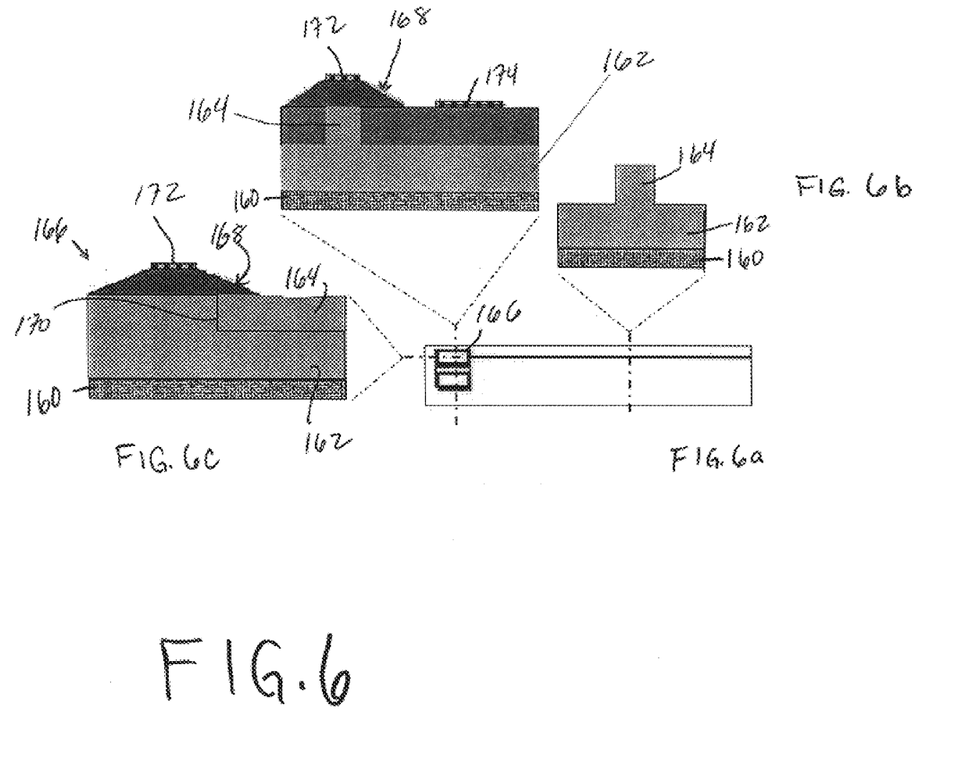
FIG. 6 illustrates a silicon based array waveguide grating integrated with a germanium detector array.

FIG. 6 shows a modification of the array waveguide grating structure having an integrated germanium detector array formed on the SOI substrate of the array waveguide grating structure. The FIG. 6 detector array is particularly useful as the detector elements in the transceiver illustrated in FIG. 5. FIG. 6a shows a plan view of the waveguide and a single detector of what may be an array of waveguides and a corresponding array of detectors. The FIG. 6 structure is formed in this illustration on the preferred SOI wafer using conventional silicon processing techniques. FIG. 6b shows a cross section through the waveguide portion of the structure, including the oxide layer 160, the silicon surface layer 162 and the waveguide structure 164. The direction of the cross section for FIG. 6b and the other cross sections of this illustration are shown by dashed cut lines on FIG. 6a. One channel of light propagates within the waveguide 164 and is guided to the detector 166 (FIGS. 6a & 6c). The waveguide 164 continues on the surface of the silicon substrate and is coupled directly to the detector 166, as shown in FIG. 6c.

The detector 166 shown in FIG. 6c includes a germanium detector 168 such as a PIN diode separated from the silicon surface 162 by a silicon-germanium buffer layer. The waveguide 164 terminates at a surface 170 so that the signal within the waveguide 164 is guided at least in part into the germanium detector. Metal layer 172 is one of the contacts for the PIN diode. FIG. 6d shows a different view of the detector, and shows the second metal layer contact for the PIN diode. Further description of this detector is provided below with reference to FIG. 7.

Figure 7:
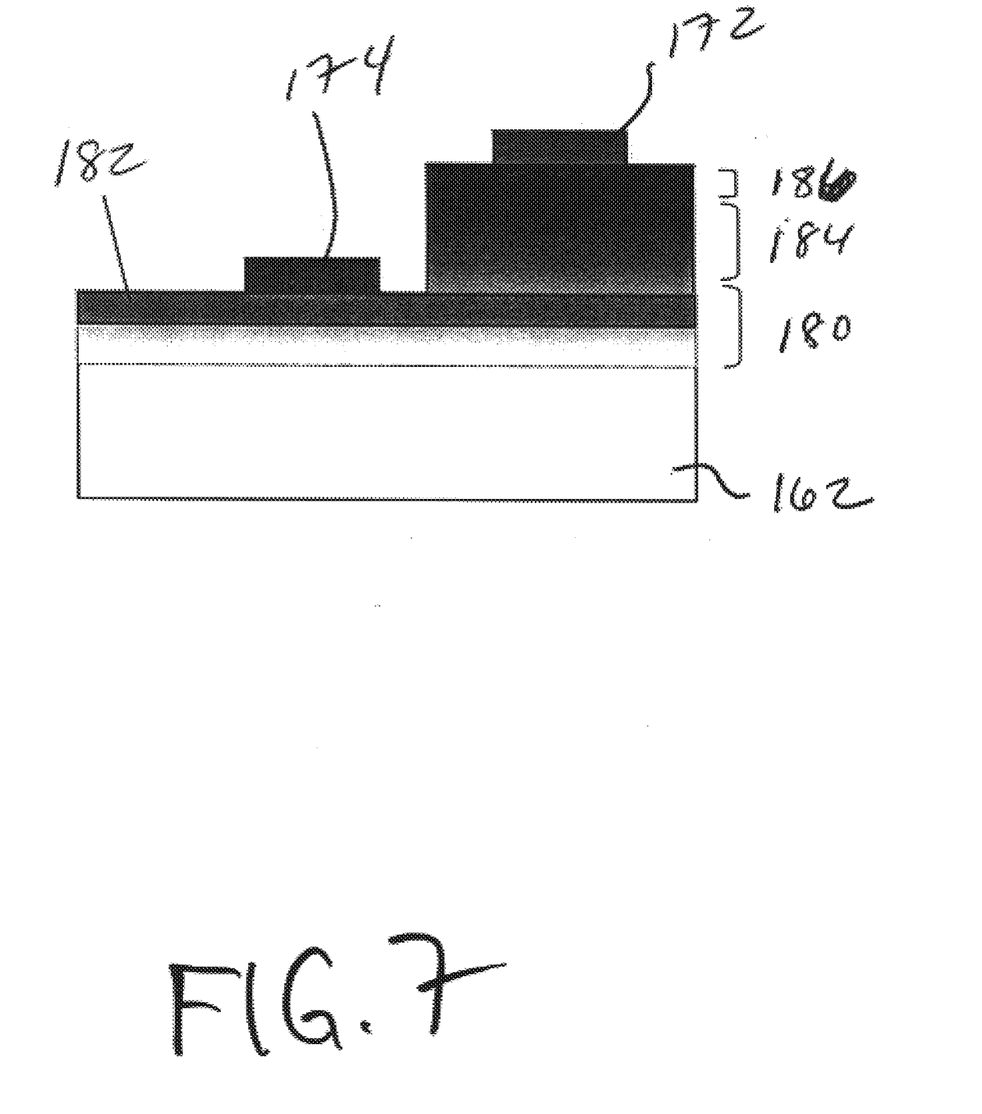
FIG. 7 illustrates another silicon based array waveguide grating integrated with a germanium detector array.

FIG. 7 shows another detail of the integrated wavelength analyzer with a detector array as discussed with respect to FIGS. 5 and 6. The same identification numerals are used in FIG. 7 to identify similar structures in FIG. 6 to the extent possible. The SOI array waveguide grating structure is not shown in FIG. 7, but a more detailed illustration of the PIN diode is shown. Layer 162 is the silicon surface layer of the SOI substrate and, in many preferred embodiments is device grade silicon so that other circuitry can be formed on the silicon.

A two or more stage buffer layer 180 is formed on the surface of the silicon layer 162. This buffer layer relieves strain in the interface between the silicon layer and the epitaxial germanium layers. The buffer layer typically includes two or more layers of silicon-germanium of different germanium composition. Other applications may use a continuously graded buffer or a combination of layers and graded structures. In some instances it may be desirable to use a heterostructure or a superlattice to more efficiently reduce the strain of the mismatch between the silicon and germanium lattices. A relatively low germanium content layer is positioned immediately adjacent the surface of the silicon layer 162. A high germanium content surface layer 182 is provided at the surface of the buffer layer 180 and may be a silicon-germanium layer or the final layer 182 may be a germanium layer without silicon. For a graded germanium buffer layer, the buffer layer is typically formed to a thickness on the order of 0.2 $\mu$m to 5.0 $\mu$m, although this range is only exemplary and different thicknesses can readily be used.

The germanium and silicon-germanium layers can be deposited using molecular beam epitaxy (MBE) or metal organic chemical vapor deposition (MOCVD). Such techniques for depositing silicon-germanium and germanium on silicon substrates have come into common use at this time for high-speed (RF) circuitry.

Layer 182 is preferably part of the germanium PIN detector and is preferably highly doped N type or highly doped P type, for the opposite configuration and bias of diode. An intrinsic germanium layer 184 is provided on a portion of the doped base layer 182 to a preferred thickness of between about 0.5 $\mu$m and 2.0 $\mu$m, depending on the efficiency of the desired detector. A preferred intrinsic germanium layer 184 thickness of about 1.0 $\mu$m will produce an internal quantum efficiency of between about 60%–70%. A surface layer 186 of highly doped P type germanium is provided on the intrinsic germanium layer 184 to complete the PIN diode structure. If the opposite configuration and bias of PIN diode is used, the surface layer is chosen to be highly doped N type germanium. Masking, deposition and etching processes for forming PIN diodes of this configuration are well known. Basically, the three layer PIN stack is formed and then an island is defined by etching down to the base layer 182. Metal contacts 172 and 174 are then provided by deposition and patterning.

Germanium PIN diodes are generally known including their manufacture as discrete components and their use as detectors. Different configurations of detector are possible. In addition, the size of the detector can be selected according to the particular application. Large detectors collect more light; smaller detectors are faster. Also, depending on the wavelength range of the light used in the optical communication system, it may not be necessary to provide an entirely germanium device. In many instances a silicon-germanium PIN diode can be formed and as used effectively. Often the gain and efficiency of such devices is not as high, but such detectors are otherwise preferred if the detection wavelengths are appropriate to the application. Silicon-germanium detectors require less buffering from the silicon substrate and tend not to have as significant of optical reflections and so optical coupling is simpler and potentially more efficient.

Here, an array of germanium PIN diodes is formed by thin film epitaxy on the silicon surface of the preferred SOI substrate of the PIC component. This integration strategy reduces manufacturing costs by further simplifying assembly. In addition, the integration can improve the efficiency of the interface to the detector by avoiding semiconductor-air interfaces and instead forming silicon to germanium interfaces or graded interfaces that optimize coupling.

Figure 8:
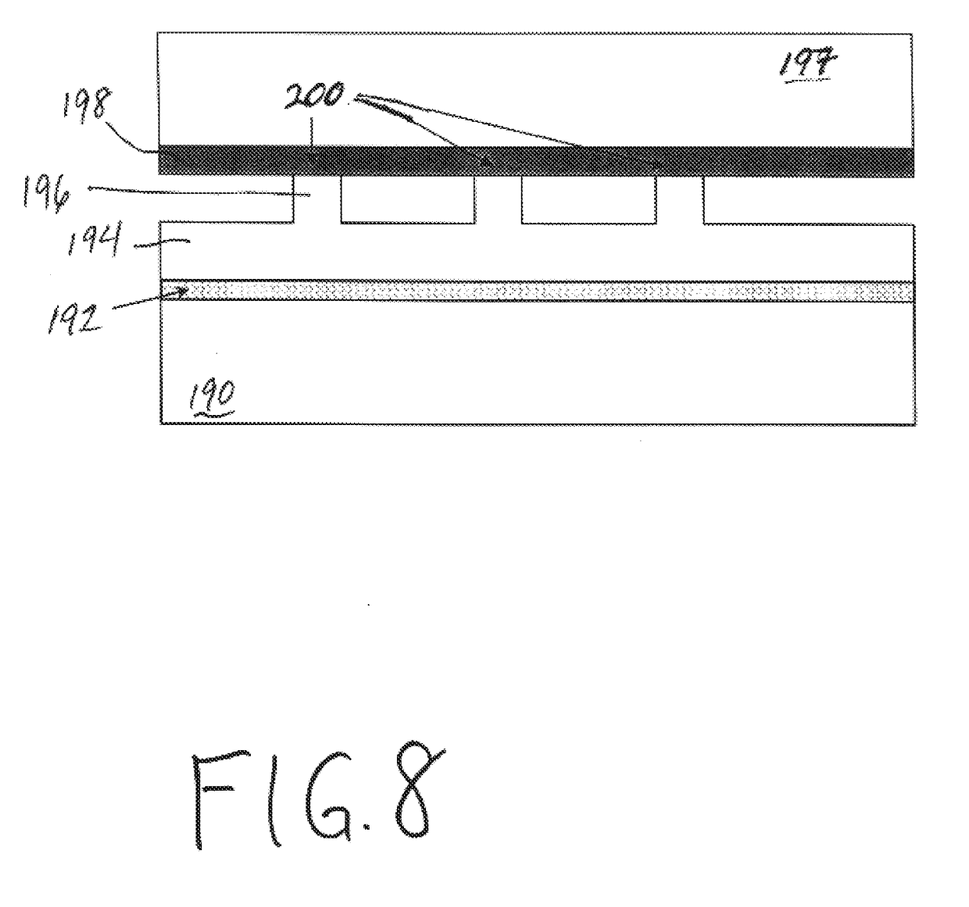
FIG. 8 illustrates a process step in forming a device such as that illustrated in FIG. 7.

FIG. 8 shows an alternate method to the epitaxial strategy discussed above for forming the germanium detectors arrays on the SOI structure of, for example, FIGS. 5–7. FIG. 8 illustrates the use of fusion bonding to form the structure or an equivalent structure to that illustrated in FIG. 6. This technique can be used to bond an InP/InGaAs wafer or a germanium wafer to a silicon surface of either a silicon wafer or silicon on insulator (SOI) substrate. The junction is formed on the basis of atomic bonding and has been observed to be sufficiently durable for manufacturing and use. The illustrated embodiment is of bonding a germanium wafer to an SOI waveguide structure like that illustrated in FIGS. 1 and 2. The SOI wafer includes a silicon substrate 190, a buried oxide layer 192 and a silicon surface layer 194. Waveguides 196 are shown in cross section and correspond to the waveguides coupled to detectors discussed above. When this bonding technique is used with InP/InGaAs wafers, it may be used to bond emitters (diode or laser) or amplifiers to the waveguides on the surface of the silicon substrate. The illustrated germanium wafer 197 includes a surface layer 198 adapted for forming active devices. For example, the surface layer 198 may include a three layer PIN structure so that germanium or silicon-germanium diodes can be formed at positions 200 on the waveguides.

The fusion bonding method proceeds after the waveguides and circuitry desired for the silicon surface layer 194 are formed and the desired surface layer 198 is formed on the germanium or other substrate 197. Following chemical cleaning, the SOI wafer 190 is dipped into a hydrofluoric acid (HF) solution to remove native oxide from the surface of the waveguides 196. This chemical treatment terminates the dangling bonds of the silicon surface with hydrogen atoms. Then both the SOI wafer 190 and the germanium (or InGaAsP) wafer 197 is loaded into an oven filled with a hydrogen ($H_2$) atmosphere with the proper crystal alignment and pressure. Uniaxial pressure is typically applied evenly over the surface of the wafers by pressure plates. The pressed wafers are then heated up to preferably about 500° C. temperature for approximately on half-hour. Variations in the temperature and duration of the fusion boding process are possible and can readily be determined through well known process optimization techniques.

After fusion bonding, unwanted portions of the wafer 197 are preferably removed to complete the device formation to produce structures like those illustrated in FIG. 6, for example. Removing the undesired portions of the wafer 197 also helps to reduce the potential for stress and strain at the interface between the different materials. The completed device is shown in FIG. 9, with germanium PIN diodes 202 formed on the surface of the waveguides 196.

Figure 9:
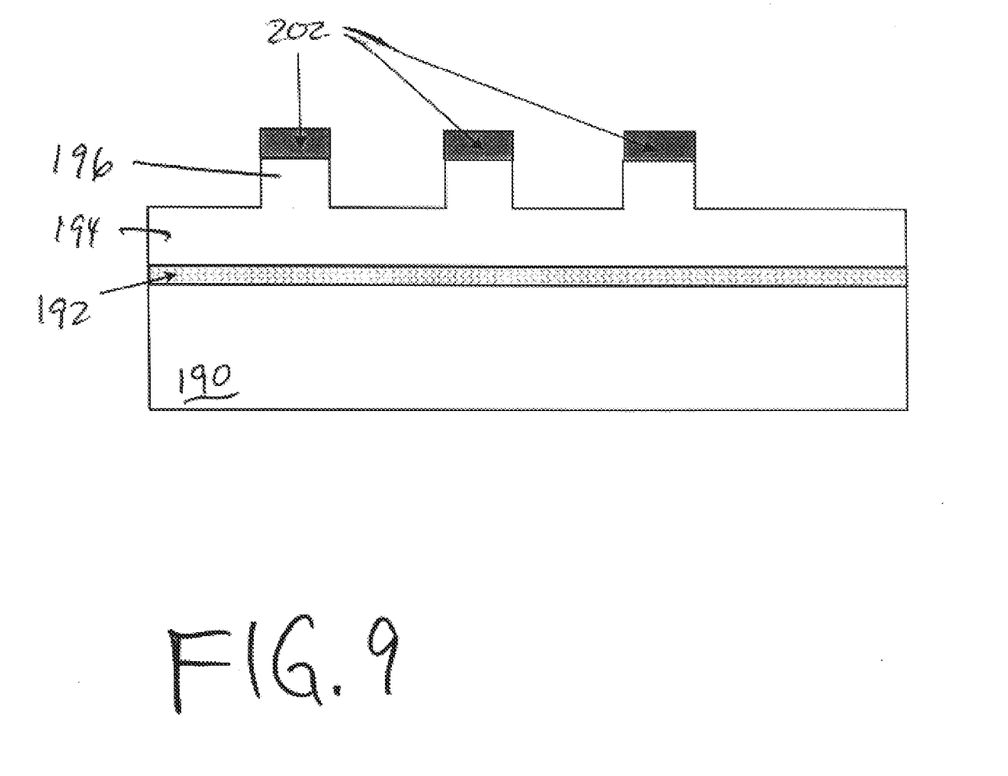
FIG. 9 illustrates a further process step in forming a device such as that illustrated in FIG. 7.
Figure 10:
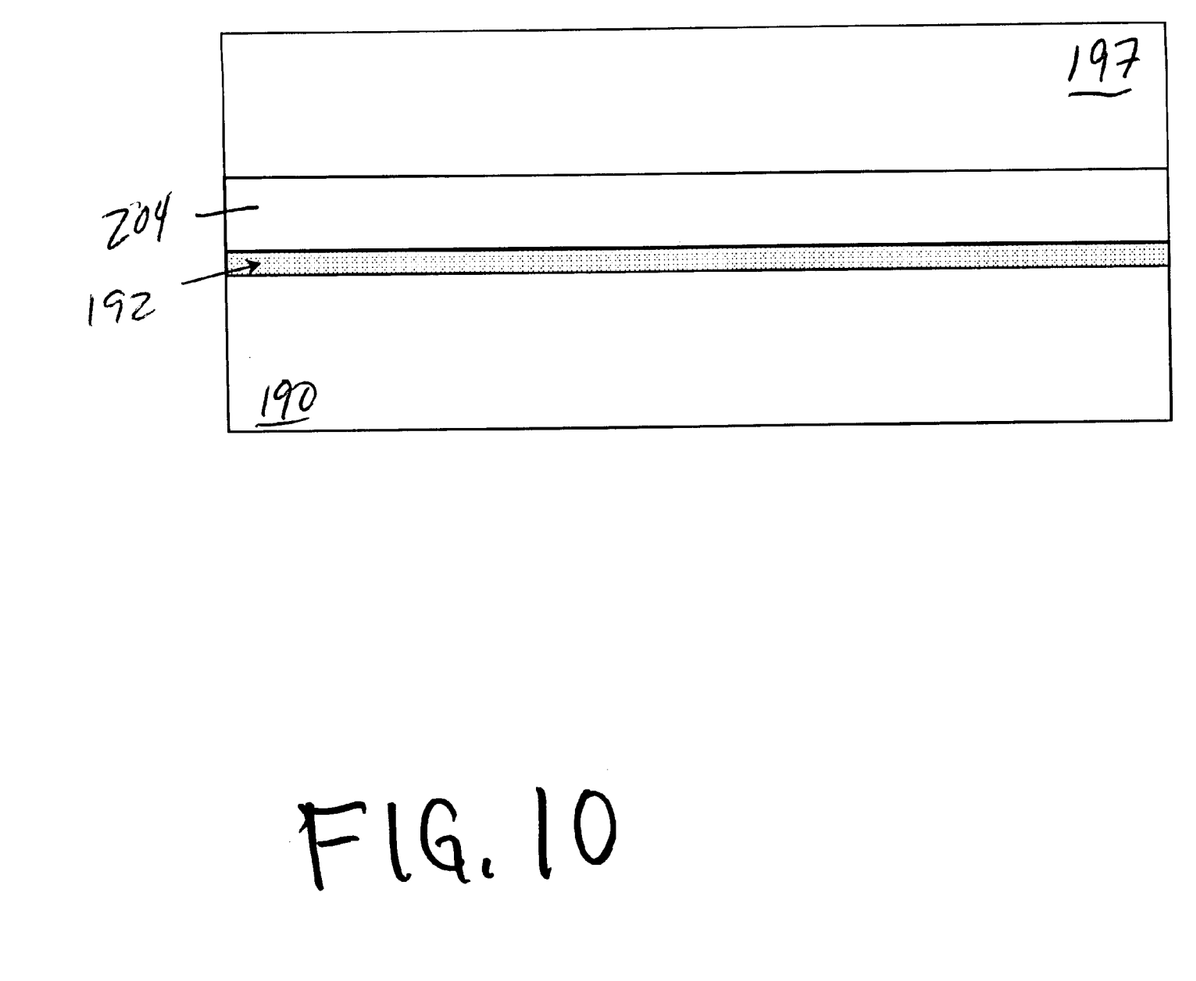
FIG. 10 illustrates another process for forming a structure in accordance with certain aspects of the present invention.

FIG. 10 shows an alternate method for forming the structure of FIG. 9. Here, the SOI wafer is not completely processed and the waveguides are formed after the wafers are bonded and the unwanted portions of the wafer 197 are removed. Thus, the surface of the wafer 197 is prepared as desired for the types of devices that are to be formed from that layer. The surface layer 204 of the SOI substrate 190 is cleaned and may have circuitry formed on it, but has not had waveguides formed. The wafers are fusion bonded together and then the unwanted portions of the wafer 197 are removed. The waveguides can then be formed in a self-aligned etching process.

The present invention has been set forth with reference to certain particularly preferred embodiments thereof. Those of ordinary skill in the art will appreciate that the present invention need not be limited to these presently preferred embodiments and will understand that various modifications and extensions of these embodiments might be made within the general teachings of the present invention. Consequently, the present invention is not to be limited to any of the described embodiments but is instead to be defined by the claims, which follow.

What is claimed:

1. An optical component:

a silicon on insulator substrate having an plurality of waveguide structures formed on a surface, at least a portion of the array comprising substantially parallel waveguide structures, the substrate further comprising an array waveguide coupled to the plurality of waveguide structures;

N germanium optical detectors, each germanium optical detector fusion bonded to a surface of a corresponding one of the waveguide structures, the N germanium optical detectors comprising a second semiconductor material different from a surface of the silicon on insulator substrate, the array wave guide separating an input light beam into N channels and providing the N channels through the plurality of waveguides to corresponding ones of the N germanium optical detectors so that light from a corresponding channel of the array waveguide is coupled into a corresponding optical detector and converted into an electrical signal.

2. The optical component of claim 1, wherein the germanium optical detectors are PIN diodes.

3. The optical component of claim 1, wherein the germanium optical detectors consist essentially of germanium.

4. The optical component of claim 3, wherein the germanium optical detectors are PIN diodes.

* * * * *